United States Patent

[11] 3,591,917

[72] Inventors Chester S. Shira
Canoga Park;
Ralph E. Nugent, Santa Susana, both of, Calif.
[21] Appl. No. 766,098
[22] Filed Oct. 9, 1968
[45] Patented July 13, 1971
[73] Assignee North American Rockwell Corporation

[54] PROCESS FOR JOINING SURFACES
7 Claims, 5 Drawing Figs.
[52] U.S. Cl. ............................................. 29/494,
29/501, 29/504, 75/175.5
[51] Int. Cl. ..................................... B23k 31/02,
B23k 35/38
[50] Field of Search ............................... 29/494,
501, 504; 75/175.5

[56] References Cited
UNITED STATES PATENTS
| | | | |
|---|---|---|---|
| 3,065,533 | 11/1962 | Dungan et al. | 29/504 X |
| 3,366,475 | 1/1968 | Kaarlela | 75/175.5 X |
| 3,442,641 | 5/1969 | Albers | 29/504 X |

Primary Examiner—John F. Campbell
Assistant Examiner—Ronald J. Shore
Attorneys—Thomas S. MacDonald and L. Lee Humphries ABSTRACT: A method for joining refractory and reactive surfaces to themselves or to other surfaces by depositing a layer of a titanium-indium alloy between the joinable surface, and heating under vacuum to evaporate the indium to leave a layer of titanium joining the surfaces. Also, a method for joining the surfaces with the alloy by resistance bonding of said surfaces.

PATENTED JUL 13 1971

3,591,917

INVENTORS.
CHESTER S. SHIRA
RALPH E. NUGENT

BY Paul L. Sabatine

ATTORNEY

3,591,917

PROCESS FOR JOINING SURFACES

BACKGROUND OF THE DISCLOSURE

The ever-present technological demand for metal surfaces capable of performing at high temperatures has focused attention on the refractory and reactive metals of Group IV, V and VI of the periodic chart. These metals, if they are to be used successfully in structures, must be joined to themselves and to other materials. The prior art welding and brazing techniques as routinely employed for joining refractory metals of the above listed groups are generally not acceptable for intimately bonding all the refractory and reactive metals to themselves and to other surfaces. For example, in spot welding operations of various refractory metals the primary difficulty lies in electrode sticking; and, in the case of molybdenum and tungsten, low ductility is a problem. In the use of the fusion-welding process for bonding refractories, specially designed alloys are required and the welds must be protected from atmospheric contamination. Other problems frequently encountered in joining refractory metals by the prior art techniques are cracking, cratering, poor bonding adhesion, low service temperatures and the like.

Thus, it will be appreciated by those skilled in the instant art that if a novel brazing or welding process for joining refractory and reactive metals to themselves and to other surfaces is made available to the art, said process would have a positive use and wide application in the fields of industry and science. Also, it will be further appreciated by those knowledged in the art that if a novel process characterized by its low-temperature applications for forming successful and firmly bound like and unlike refractory and reactive joints for high-temperature service is made available to the art, said process would represent a significant contribution to the art.

Accordingly, it is an object of the present invention to provide a novel process for intimately bonding refractory and reactive metals to themselves and to other surfaces.

Another object of the present invention is to make available a relatively inexpensive process for joining tungsten, vanadium, columbium, tantalum, molybdenum and titanium to themselves and to each other and wherein the finally joined surfaces are essentially free from cracking, cratering, and the like and applied at a reasonably low temperature with imroved wetting and flowing of the filler alloy with much reduced residual strain and distortion in the members being joined.

Still a further object of the present invention is to provide a low-temperature brazing process suitable for joining surfaces for high-temperature service.

Yet a further object is to employ a binary alloy that can easily be used for joining refractory parts to themselves and to other parts.

Still a further object is to employ an alloy suitable for lower temperature applications by the addition of beryllium, silver and the like to a binary titanium-indium system which alloy can be used for joining like or unlike surfaces.

Yet still a further object of the invention is to provide and use an alloy for improved joining of refractory and reactive members using conventional arc welding or brazing techniques.

Still a further object of the invention is to provide a means for overcoming the joining difficulties associated with the prior art.

These and other objects, features and advantages, will be readily apparent to those skilled in the art from the following specification and the appended claims.

SUMMARY OF THE INVENTION

This invention is concerned with a low-temperature process for intimately bonding refractory and reactive metals in Group IV, V and VI to like and unlike surfaces. The surfaces are joined by using an alloy consisting essentially of titanium and indium. After the surfaces are firmly bonded, the indium is partially evaporated to produce a composite of two like or unlike surfaces bonded by an intermediate titanium layer. Also, the alloy can be used to intimately join surfaces by other techniques such as welding, brazing and the like.

DETAILED DESCRIPTION OF THE INVENTION

Figure 1:
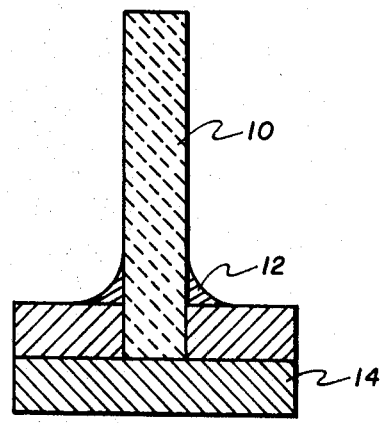

In attaining the novel objects and unobvious advantages of this invention, it has now been unexpectedly found that an alloy composed of titanium and indium can be successfully employed for intimately and firmly bonding refractory metal surfaces to themselves or to other surfaces.

The binary alloy consists essentially of commercially available titanium and indium. The brazing alloy as employed herein generally consists essentially of 70 to 80 weight percent titanium and 20 to 30 weight percent indium with the now preferred alloy consisting of from 74 to about 76 weight percent titanium and from about 23 to about 27 weight percent indium. Exemplary of a presently preferred alloy composition is a binary system of 75 weight percent titanium and 25 weight percent indium with a solidus temperature of approximately 1,800° F. and a liquidus temperature of approximately 1,900° F. Additions of beryllium, gold, nickel and similar metals can be made to further depress the melting temperature to a desired point. Generally, the amount of temperature depressing metal will be present in a range of 0.1 weight percent to about 10 weight percent.

The alloy employed herein can easily be prepared by methods known to the art, for example, a desired amount of titanium (melting temperature = 1,668°C.) in finely divided form is intimately mixed with a desired amount of low-melting indium, and the mixture heated to slightly above the melting point of the low-melting material and then extruded or shaped into the predetermined desired form. The shaped product, in rod or other suitable form, is then heated to 1,200° to 1,700°F. until interdiffusion takes place to give the desired alloy. Other art known procedures for preparing titanium-indium alloys are set forth in Chemical Abstracts, Vol. 52, p. 14,514, 1958, and in Constitution of Binary Alloys, First Supplement, by Rodney P. Elliott, McGraw-Hill Book Company, 1965, pp. 555–556, and in the references cited therein.

Exemplary of the refractory and reactive metals in Group IV, V and VI suitable for joining by the process of the present invention are tungsten with a melting point of 3,410° C., tantalum with a melting point of 2,850° C., vanadium with a melting point of 1,900° C., columbium with a melting point of 2,468° C., molybdenum with a melting point of 2,620° C., titanium with a melting point of 1,668° C. and the like.

Generally, in joining surfaces or parts according to the spirit of the present invention, the surfaces or parts to be joined are first placed in close proximity with the alloy intimately dispersed between the part. The brazing or welding of the parts or surfaces is usually performed in an inert atmosphere such as argon, or helium or in a reducing atmosphere such as hydrogen or the like. Also, since the refractory metals usually have a strong affinity for the atmosphere gases, such as oxygen and nitrogen, the welding or brazing should be carried out in an atmosphere essentially free from a like contaminating atmosphere. The brazing or welding cycle is usually performed at ambient or higher pressures, and, after the joining process is complete, the pressure may be reduced to allow the indium component of the alloy to volatilize or evaporate. As the indium evaporates under the reduced atmosphere, the solidus temperature of the alloy increases and eventually approaches that of titanium at about 3,035° F. The resulting article is thus firmly brazed or welded by an essentially all titanium joint and it possesses stability and mechanical strength at temperatures above the original melting temperature of the brazing alloy. The surfaces, refractory or metal, can also be joined by resistance bonding procedures which comprise placing a layer of the titanium-indium alloy between the surfaces, passing electrical energy across said surfaces while maintaining the surfaces under pressure to produce the desired joined surfaces.

The term reactive as used herein has its conventional meaning and it includes titanium, zirconium, hafnium and the like.

The above discussion is merely illustrative of the mode and manner of carrying out the invention and it is to be understood that the discussion is not intended to be limited to the instant disclosure, as other techniques may be successfully employed. The following examples are representative of embodiments of the present invention and these examples are not to be construed as limiting as other obvious embodiments will be readily apparent to those versed in the present art.

DESCRIPTION OF PREFERRED EMBODIMENTS

EXAMPLE I

A short piece of molybdenum tubing with a wall thickness of 0.005 inches and an outside diameter of 0.264 inches was positioned at right angles against a square plate of molybdenum measuring 1 inch by 1 inch and 0.213 inches thick. Then, a small quantity of a commercially available alloy consisting essentially of 75 weight percent titanium and 25 weight percent indium was beaded around the tubing at its point of intimate contact with the square molybdenum plate. Next, the tubing plate alloy composite was induction brazed at 2,150° F. for about 160 seconds in an argon atmosphere. During the heating period, the brazing alloy appeared to change indicating a good melt. After cooling to room temperature in the argon atmosphere, visual inspection indicated good alloy bonding of the tube to the plate.

EXAMPLE II

Two sections of molybdenum wherein each section measured about 1 inch square were firmly joined together by a layer of titanium according to the following procedure: First, a layer of an alloy consisting of 75 weight percent titanium and 25 weight percent indium was placed between the plates and the plates placed in a furnace. Then, the furnace atmosphere was purged with argon for about 10 to 15 minutes to remove essentially all of the normal atmosphere from the furnace. The furnace was next heated to 2,000° F., the argon purge discontinued, and vacuum pumped with continuous heating to 2,200° F., the brazing temperature. The heating or brazing temperature was maintained at this latter temperature for 30 minutes with a constant vacuum during the heating period. Then, the temperature was reduced to 2,000° F. and held at this temperature for 2½ hours while continuing to pull the full vacuum. Next, the temperature was lowered to 1,000° F. and argon readmitted into the furnace. The temperature was finally lowered to room temperature to give the resultant molybdenum to molybdenum composite wherein the molybdenum parts are firmly joined by essentially pure titanium.

EXAMPLE III

The procedure employed in example II was followed in this example, except that the parts joined were essentially pure tungsten plates. The tungsten parts were successfully joined by following the brazing procedure as set forth in the above described example.

EXAMPLE IV

The procedure employed in example II was followed in this example, except that two different refractory parts were joined. For example, a section of titanium was joined to a section of molybdenum. The titanium-molybdenum parts were successfully joined by following the processing procedure as set forth in the above described example.

EXAMPLE V

Two sheets of commercially available alloyed titanium each about 0.040 inches thick can be firmly bonded according to the spirit of the present invention by employing a resistance bonding technique. The resistance method involves, first, placing a titanium-indium alloy shim between the surfaces to be joined, second, passing resistance energy in the form of electricity, for example, about 10,000 amps, across the composite metal shim surfaces while maintaining the composite under pressure, for example, about 500 pounds, to produce said solid bonded surfaces.

EXAMPLE VI

Two sheets of commercially alloyed titanium were prepared and grooved for welding; 0.040 inch × 0.060 inch × 6 inch strips of titanium-indium were sheared and used as filler wire for gas tungsten arc welding (brazing). A weld (braze) joint was made using considerably less heat input than with conventional arc joining. The joining alloy flowed freely and wet the abutting surfaces rapidly. There was almost no distortion of the joined sheets. Mechanical properties of the resultant joint were very satisfactory up to temperatures of 1,200° F.

Figure 2:
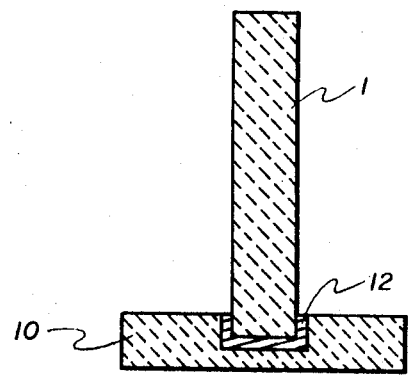
Figure 3:
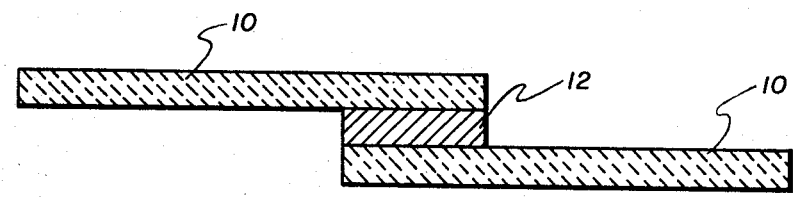
Figure 4:
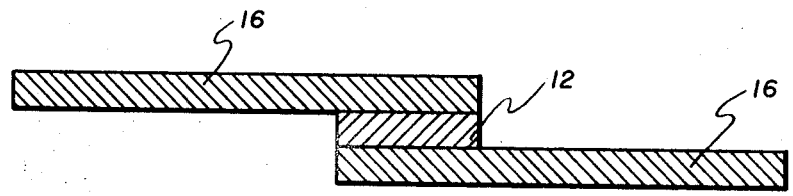
Figure 5:
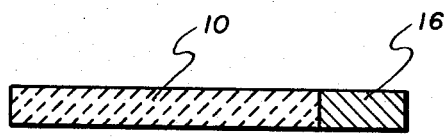

In the accompanying drawing, various joints or bonded surfaces that can be made by employing the present invention are set forth. FIG. 1 is a view showing an embodiment of the invention wherein a refractory 10 is firmly bonded by an alloy 12 to a piece of tungsten 14. FIG. 2 depicts two like surfaces, refractory 10, bonded to each other through an alloy 12. FIG. 3 depicts two flat pieces of refractory 10 bonded together by an intermediate alloy layer 12. FIG. 4 is similar to FIG. 3 except that the joined surfaces are metal 16. FIG. 5 depicts a piece of metal 16 butted to a refractory 10 section.

The novel process of the present invention can be employed to manufacture items of commerce and science. For example, the process can be used to join molybdenum surfaces as employed in ion motors, for joining refractories to refractories or to other surfaces such as ceramics for applications like nozzles in high-performance rocket engines, for throat sections of hypersonic wind tunnels and the like.

While the illustrative embodiments of the invention have been described with particularity, it will be understood that various modifications will be apparent and can readily be made by those skilled in the art without departing from the scope and spirit of the invention.

We claim:

1. A method for joining refractory and reactive metal surfaces, comprising placing an alloy consisting essentially of 70 to 80 weight percent titanium and 20 to 30 weight percent indium between said surfaces, melting said alloy to join said surfaces and heating the melted alloy under vacuum to evaporate said indium and leave a layer consisting essentially of titanium joining said surfaces.

2. The method of claim 1 in which the refractory and reactive metal is a Group IV, V or VI metal in the periodic table.

3. The method of claim 1 in which the refractory and reactive metal is tungsten, tantalum, vanadium, columbium, molybdenum, titanium, zirconium or hafnium.

4. The method of claim 3 in which the alloy contains from 0.1 to 10 weight percent of nickel, beryllium, silver or gold.

5. The method of claim 3 in which the alloy consists essentially of 74 to 76 weight percent titanium and 23 to 27 weight percent indium.

6. The method of claim 3 in which the melted alloy is heated to a temperature from 2,000° to 2,200° F.

7. The method of claim 1 in which the alloy is melted by resistance heating said alloy by the application of electrical energy.